United States Patent [19]
Pratt et al.

[11] Patent Number: 5,484,980
[45] Date of Patent: Jan. 16, 1996

[54] APPARATUS AND METHOD FOR SMOOTHING AND DENSIFYING A COATING ON A WORKPIECE

[75] Inventors: Vanon D. Pratt, Blanchester, Ohio; Eric J. Whitney, State College, Pa.; Wilbur D. Scheidt, Cincinnati, Ohio

[73] Assignee: General Electric Company, Cincinnati, Ohio

[21] Appl. No.: 23,453

[22] Filed: Feb. 26, 1993

[51] Int. Cl.⁶ .................................................. B23K 26/08
[52] U.S. Cl. .............................. 219/121.65; 219/121.66; 219/121.8
[58] Field of Search ............................ 219/121.6, 121.73, 219/121.75, 121.8, 121.84, 121.85, 121.68, 121.69, 121.65, 121.66, 121.78, 121.79, 121.81; 427/554, 557, 559

[56] References Cited

U.S. PATENT DOCUMENTS

| | | | |
|---|---|---|---|
| 3,576,965 | 5/1971 | Gugger | 219/121.79 |
| 3,743,777 | 7/1973 | Hanus et al. | 219/121.66 |
| 3,848,104 | 11/1974 | Locke | 219/121.8 |
| 4,069,080 | 1/1978 | Osborne | 156/272 |
| 4,079,230 | 3/1978 | Miyauchi et al. | 219/121.8 |
| 4,299,860 | 11/1981 | Schaefer et al. | 219/121.65 |
| 4,304,978 | 12/1981 | Saunders | 219/121.6 |
| 4,430,360 | 2/1984 | Bill et al. | 427/554 |
| 4,451,299 | 5/1984 | Smeggil et al. | 219/121.85 |
| 4,456,812 | 6/1984 | Neiheisel et al. | 219/121 LM |
| 4,468,551 | 8/1984 | Neiheisel | 219/121 L |
| 4,475,027 | 10/1984 | Pressley | 219/121.6 |
| 4,698,237 | 10/1987 | Macintyre | 219/121.85 |
| 5,080,474 | 1/1992 | Miyamoto | 350/433 |
| 5,095,386 | 3/1992 | Scheibengraber | 359/668 |
| 5,103,074 | 4/1992 | Watanabe et al. | 219/121.68 |
| 5,142,778 | 9/1992 | Smolinski et al. | 219/121.85 |
| 5,160,822 | 11/1992 | Aleshin | 219/121.8 |

FOREIGN PATENT DOCUMENTS

| | | | |
|---|---|---|---|
| 56-47288 | 4/1981 | Japan | 219/121.79 |
| 59-8676 | 1/1984 | Japan | 219/121.65 |
| 59-96273 | 6/1984 | Japan | . |
| 62-103357 | 5/1987 | Japan | . |
| 64-87096 | 3/1989 | Japan | 219/121.78 |
| 1-100302 | 4/1989 | Japan | . |
| 2-169195 | 6/1990 | Japan | 219/121.85 |

*Primary Examiner*—Geoffrey S. Evans
*Attorney, Agent, or Firm*—Andrew C. Hess; David L. Narciso

[57] ABSTRACT

An apparatus for smoothing and densifying or increasing the density of a coating on a workpiece includes a laser for generating a laser beam and a cylindrical lens for focusing the laser beam into a line of light on the coating surface. A manipulator is provided for moving one of the workpiece or the laser and the light line generated thereby relative to one another to cause the light line to scan across the coating to remove any rough portions and provide a smoother surface with a higher density depending upon the nature of the coating material. In one embodiment of the present invention, a mechanism is provided to oscillate the laser light line to homogenize adverse effects caused by any hot spots along the line.

15 Claims, 3 Drawing Sheets

1

APPARATUS AND METHOD FOR SMOOTHING AND DENSIFYING A COATING ON A WORKPIECE

BACKGROUND OF THE INVENTION

The present invention relates to laser material processing and more particularly to a laser apparatus for smoothing and densifying a coating on a workpiece, such as a thermal barrier coating (TBC) on a gas turbine engine component or the like.

SUMMARY OF THE INVENTION

A TBC applied by plasma spraying typically has a rough porous surface which may require a glazing operation to melt about a 1–2 mil upper surface layer of the TBC and to permit the layer to resolidify in a denser form referred to herein as densifying or densification with a smoother more aerodynamic surface.

One technique for densifying or increasing the density and smoothness of the surface of the TBC is to scan the surface with a laser beam focused to a circular spot. One disadvantage of this technique is that when scanning or traversing the component with the laser beam, the interaction time and the heat input may vary across the width of the beam spot resulting in non uniformity of the glazing thickness and possible unevenness in the TBC surface. Another disadvantage to using a circular laser beam spot is that the limited diameter of the spot may require many passes to fully cover a surface. Increasing the spot size to reduce the number of passes will exaggerate the variance in interaction time and heat input across the width of the spot. Additionally, some overlapping will be necessary with each pass to ensure complete coverage which can also result in non uniformity of the glazing thickness and smoothness which may adversely affect part performance.

It is accordingly a primary object of the present invention to provide an apparatus for smoothing and for increasing the density or densifying a TBC or other coating on a gas turbine engine component or workpiece which is not subject to the foregoing disadvantages.

It is another object of the present invention to provide an apparatus for smoothing and densifying a coating in a single scanning operation.

It is a further object of the present invention to provide an apparatus for smoothing and densifying a coating which ameliorates or homogenizes the detrimental effects caused by the hot spots within the laser beam, such as excess melting and penetration into the TBC which may result in a non uniform glaze thickness, waviness, and/or coating spalling.

These and other objects of the invention, together with features and advantages thereof, will become apparent from the following detailed specification when read with the accompanying drawings in which like reference numerals refer to like elements.

In accordance with the present invention, an apparatus for smoothing and densifying a coating on a workpiece includes a laser for generating a laser beam and a cylindrical lens for focusing the laser beam into a line of light on the coating surface. A manipulator arrangement, such as an industrial robot or the like, is provided for moving one of the line of light or the workpiece relative to one another to cause the line of light to scan across the coating to increase the density of the coating surface and to smooth the coating surface.

In accordance with one embodiment of the present invention, the apparatus includes an oscillating means, such as a beam spinner or the like, to cause the line of light to oscillate in a selected pattern on the coating surface to homogenize the adverse effects of any hot spots along the focused line of light and to provide increased smoothing and uniformity in thickness in at least the upper portion of the coating which has increased density caused by the scanning and oscillating laser light line.

In accordance with the present invention, a method for manufacturing a coated workpiece includes the steps of: (a) depositing a coating of material on a workpiece; (b) forming a line of laser light; (c) homogenizing the detrimental effect of any hot spots along the line of laser light; and (d) scanning the oscillating line of laser light across the coating to cause smoothing and increased density of at least an upper portion of the coating.

DETAILED DESCRIPTION OF THE PREFERRED EMBODIMENTS

Figure 1:
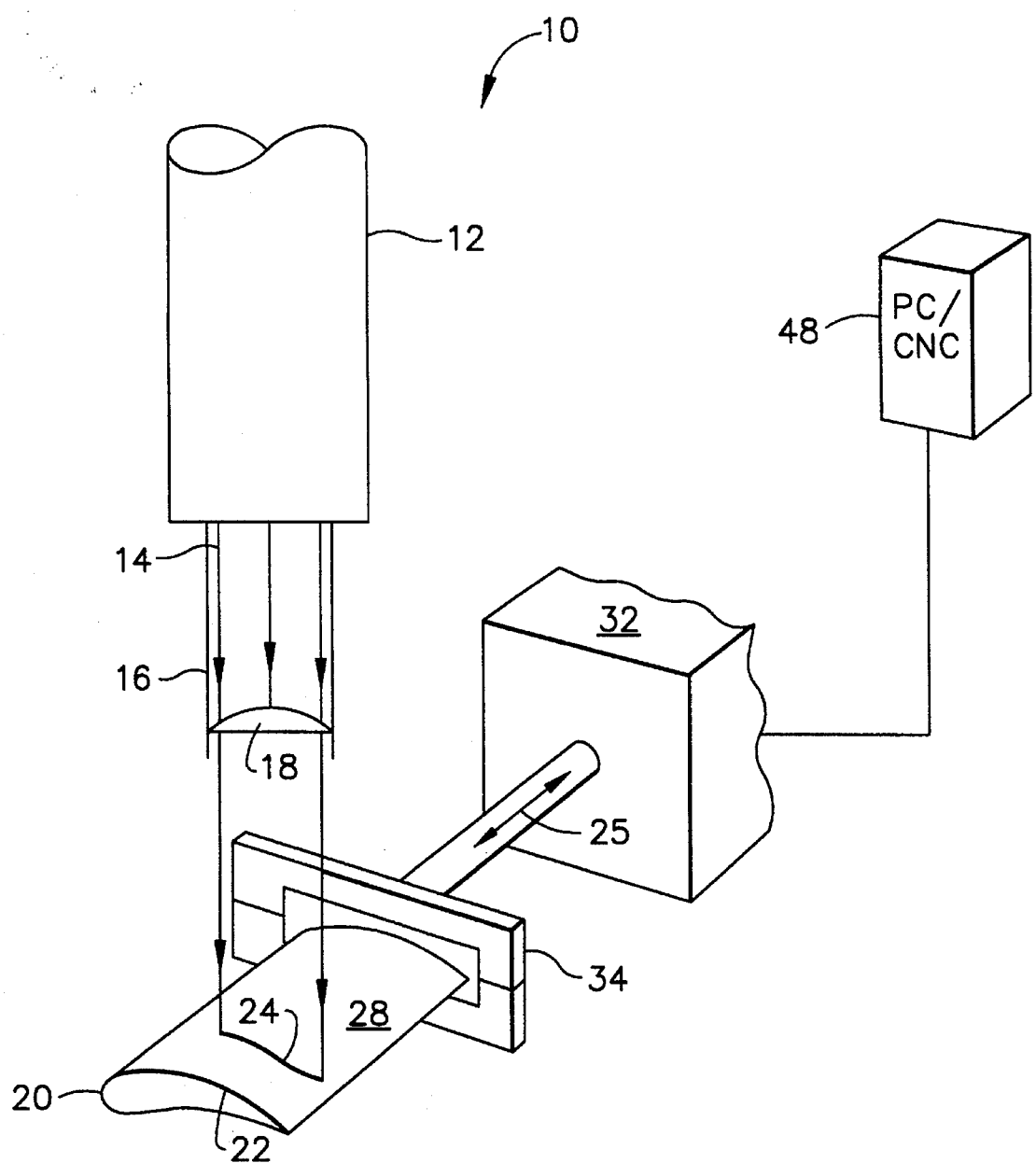
FIG. 1 is a perspective view of the apparatus for smoothing and densifying a coating on a workpiece in accordance with one embodiment of the present invention.

Referring initially to FIG. 1, the apparatus 10 includes a laser 12, such as a Spectra Physics® Model 975 $CO_2$ laser or the like, for generating a laser beam 14 having a substantially circular beam footprint or spot. The beam 14 is directed through a beam tube 16. In accordance with the present invention, a cylindrical lens 18 having a predetermined focal length is mounted in beam tube 16 in an optical path between the laser 12 and a workpiece 20 or gas turbine engine component. For example, a 10" focal length cylindrical lens 18 will produce a line focus measuring approximately 1.7" long×0.030" wide.

The present invention will be described with respect to smoothing and densifying a thermal barrier coating 22 (TBC) which has been applied to a gas turbine engine airfoil 20 by a plasma spraying or deposition process, such as that described in the Engineer's Materials Handbook®, Vol. 4, Ceramics and Glasses, beginning at page 203 as published by ASM International or as described in U.S. Pat. No. 4,377,371 or U.S. Pat. No. 5,047,612.

Figure 4A:
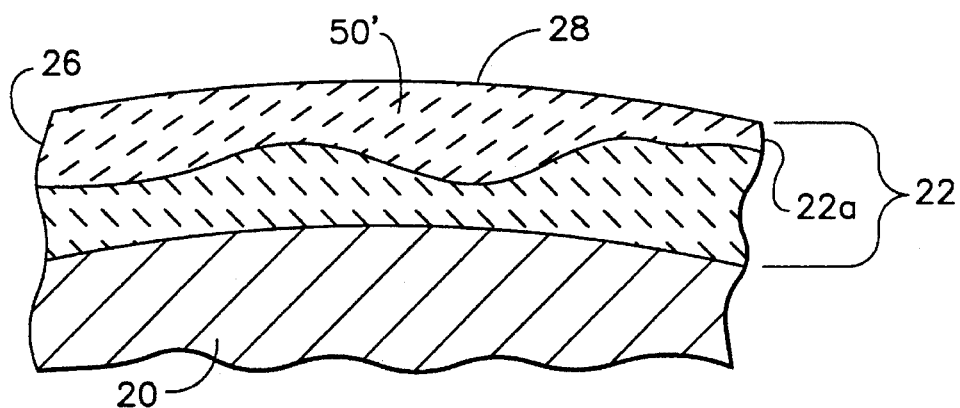
FIG. 4A is a partial cross-sectional view showing a coating on a workpiece surface and the heat affected zone and non uniformity of the densified surface position which may result without oscillation of the laser light line.
Figure 4B:
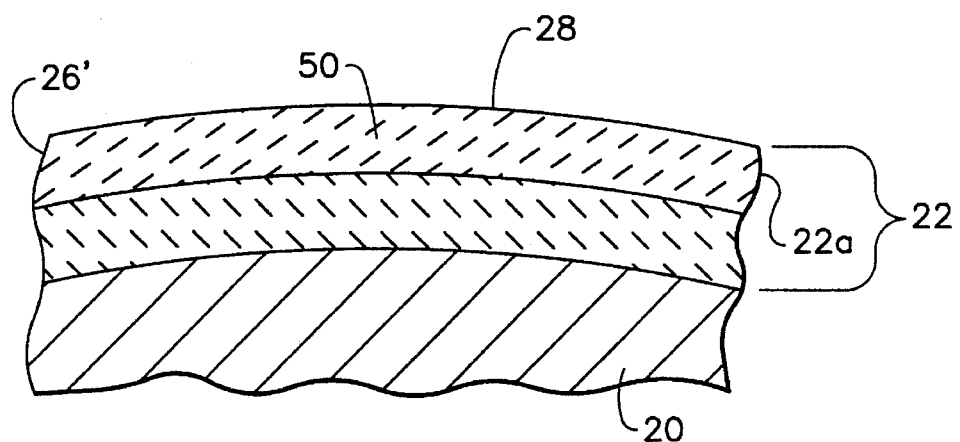
FIG. 4B is a partial cross-sectional view of a coating on a workpiece surface showing the heat affected zone and uniformity of the glazed coating surface provided by the present invention as shown by the embodiment in FIG. 2.

In accordance with the present invention, the spot diameter of the laser beam 14 and the size and focal length of the cylindrical lens 18 are coordinated to provide a focused line of light 24 on the coating surface 28 which has a predetermined width, length and power density along its length. The longer the predetermined length, the fewer the number of passes are required to smooth and densify substantially the entire coating surface 28. Pragmatically, the length of the light line 24 will be limited by the available laser power and commercially available optics for providing a longer line. The longer the line 24, the more the available laser power has to be distributed along that line and the power density at any particular location along the line 24 will be reduced as the length of the line is increased. The predetermined length and power density are coordinated to permit smoothing and increasing the density or densification of at least an upper surface portion 22a of the coating 22, as best shown in FIGS. 4A and 4B, in a single pass or scanning operation. For workpieces having a dimension less than the predetermined line length, the entire surface may be treated in a single scanning operation. For larger parts, either the laser 12 or the workpiece 20 will need to be indexed to completely treat the entire surface 28.

The predetermined power density along the line of light 24 is set according to the coating material being processed so that only the coating 22 is affected by the heat and not the underlying workpiece 20 which could result in thermal damage to the workpiece 20 or delamination of the coating 22 from the workpiece 20. For example, the predetermined power density along the line of light 24 may be between about 3500 watts/cm$^2$ and about 11,000 watts/cm$^2$ so that only a layer 26 with a thickness of about 1–2 mils in the upper portion 22a of the TBC 22 is affected by the heating effect of the laser light line 24. The heating effect of the laser light line 24 causes the coating material in the upper portion 22a of the coating 22 to melt while the laser light line 24 is momentarily incident upon that location of the coating surface 28 and to resolidify in a denser layer 26 with a smoother surface after the laser light line 24 scans past this location on the coating surface 28. The predetermined power density is, therefore, only of a sufficiently high level to affect only the upper portion 22a of the coating 22 so that none of the coating material is actually removed nor is the workpiece 20 affected by the heat of the laser light line 24.

In accordance with the present invention, a computer numerically controlled (CNC) manipulator 32, such as an industrial robot or the like, may be used to move the workpiece 20 relative to the laser light line 24 to scan or pass the laser light line over the coating surface 28 to be treated. The light line 24 is, preferably, scanned across the workpiece surface 28 in a scanning direction 25 which is substantially perpendicular to the direction of the light line 24 to provide substantially complete coverage. The manipulator 32 includes a fixture 34 for holding the workpiece 20 for movement of the workpiece under the laser light line 24 along the scanning direction 25 or axis as illustrated by the double headed arrow in FIG. 1.

While the present invention has been described with respect to a manipulator 32 for moving the workpiece 20 relative to the laser line of light 24, those skilled in the art will recognize that the manipulator 32 could have been attached to the laser 12 and the workpiece 20 may remain fixed for scanning the line of light 24.

The apparatus 10 of the present invention as shown in FIG. 1 has been found to reduce the surface roughness of a plasma sprayed TBC coating from about 450–600 μin. $R_a$ (roughness average) surface roughness to an $R_a$ surface roughness as low as about 95 μin. using a profilometer, such as a Surtronic® model 3, as manufactured by Rank, Taylor and Hobson, of Leicester, England.

Figure 2:
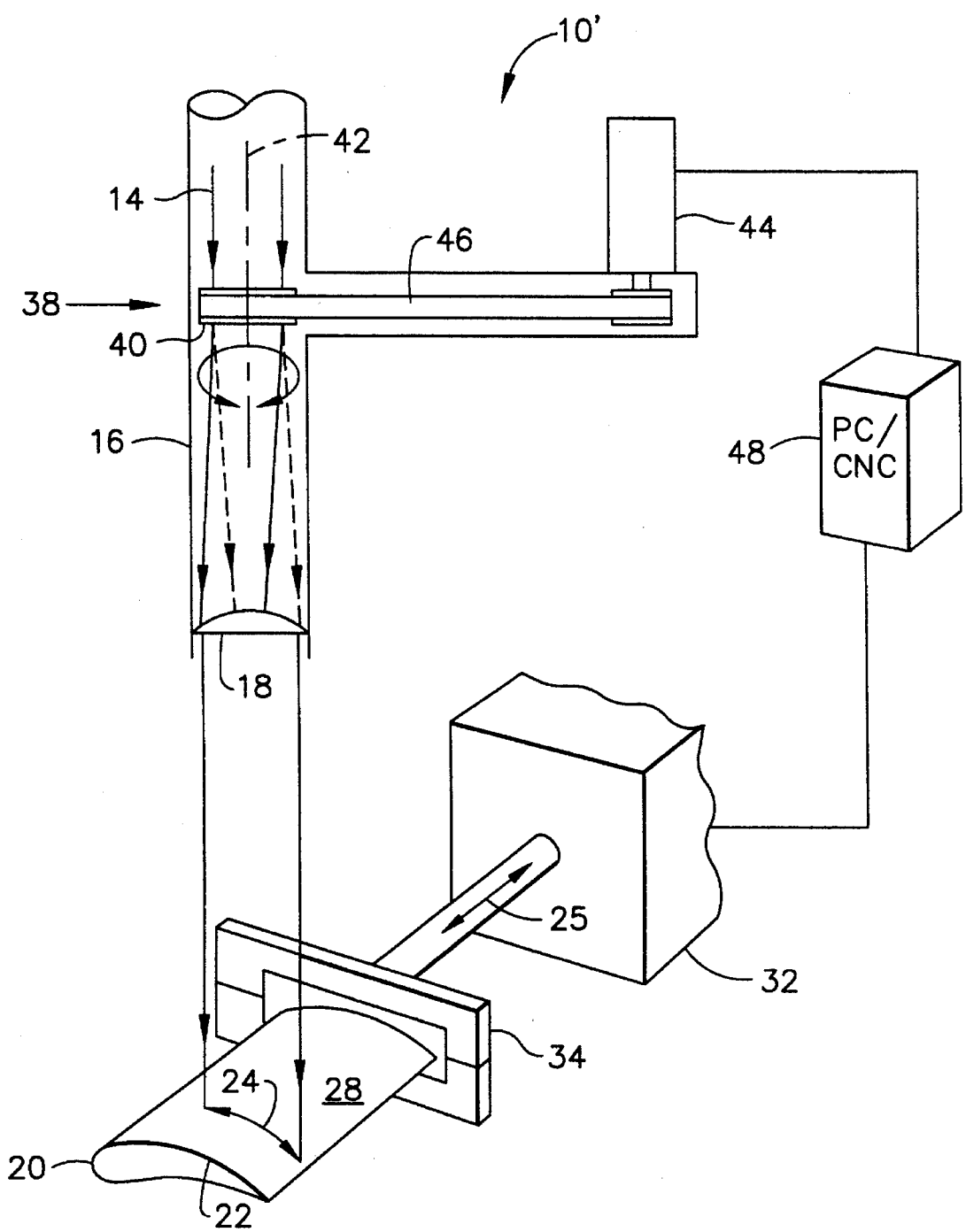
FIG. 2 is a perspective view of an apparatus for smoothing and densifying a coating on a workpiece in accordance with another embodiment of the present invention.

Referring to FIG. 2, another embodiment of the present invention is illustrated which may be used to provide a fine, very smooth micro surface finish, in those applications where such a finish is desired. The apparatus 10' is similar to that shown in FIG. 1 but further includes a mechanism 38, such as a beam spinner or the like, for oscillating or rotating the laser light beam 14 in a predetermined pattern which causes the laser light line 24 to oscillate in a corresponding predetermined pattern, such as a circular pattern 40, as illustrated by the broken line in FIG. 3. The mechanism 38 or beam spinner includes an optical element 40, such as a ZnSe wedge which is mounted for rotation about an axis of rotation 42 in the beam tube 16. The optical element 40 is rotated by a variable speed drive motor 44 which is mechanically coupled to the optical element 40 by a drive belt 46. The variable speed drive motor 44 and the manipulator 32 are each preferably coupled to a programmable controller or CNC 48 of the manipulator 32 to coordinate oscillation of the light line 24 in coordination with the scanning of the laser light line 24 or the workpiece 20 relative to one another to cause the smoothing and densification of the coating 22 on the workpiece 20. The light line 24 is preferably oscillated at a frequency or speed substantially faster than the scanning speed of the light line 24 to provide homogenization of the heat affected zone 50 and uniformity in the densified layer 26' (FIG. 4B). The programmable controller 48 permits preprogramming and adjustment of the oscillating speed and the scanning speed relative to one another, and controller 48 may further include computer storage capacity or be coupled to a storage unit for storage and retrieval of processing parameters such as oscillatory speed, scan speed, line width, line length and power density to permit retrieval and analysis of the treatment process.

While the present invention has been described with respect to using a beam spinner 38 to cause the laser light line 24 to oscillate in a predetermined pattern 40, those skilled in the art will recognize that other optical elements such as rotating or wobbling mirrors actuated by a motor or similar mechanical means could be used as well to cause oscillation of the laser light line 24 and homogenization of the heat affected zone 50.

Figure 3:
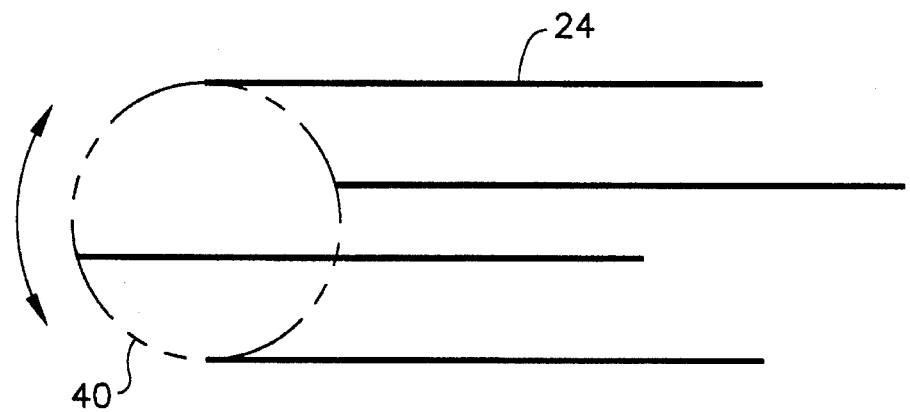
FIG. 3 illustrates an oscillatory pattern followed by the laser light line generated by the apparatus of FIG. 2.

Oscillating the laser light line 24 causes amelioration or homogenization of the heat affected zone 50 which corresponds to the treated upper portion 22a of the coating 22 as shown in FIG. 4B. Oscillation of the laser light line 24 reduces any adverse effects or non uniformity caused by variability of the depth of the heat affected zone 50', as shown in FIG. 4A, which may exist because of variations in the power density along the line of light 24. In effect, the spinning or oscillation of the laser light line 24 exposes a larger area of the coating surface 28 to substantially the entire light line 24, including any hot spots, such that variations in the power density along the light line 24 are averaged. The oscillating light line 24 as shown in FIGS. 2 and 3 provides an upper coating layer 26' with a substantially uniform thickness and density across the extent of the coating 22 scanned by the laser light line 24.

Oscillation of the laser light line 24 and the resulting homogenization of the heat affected zone 50 has been found to reduce the surface roughness from about 450–600 μin. $R_a$ to as low as about 44 μin. $R_a$. In addition to the much improved micro surface finish, the macro surface finish treated by the oscillatory light line 24 was found to be smoother and consistent with no craters or ridges which may sometimes result when coatings are treated by other techniques.

It will be readily understood by those skilled in the art that the present invention is not limited to the specific embodiments described and illustrated herein. Different embodiments and adaptations besides those shown herein and described, as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. An apparatus for smoothing and densifying a coating on a workpiece, comprising:

a laser for generating a laser beam;

a cylindrical lens for focusing said laser beam into a line of light on the coating surface;

means for moving said line of light and the workpiece relative to one another to cause said line of light to scan across the coating to remove rough portions and provide a smooth glaze surface; and a beam spinner disposed in an optical path between said laser and said cylindrical lens for oscillating said line of light.

2. The apparatus of claim 1, wherein said cylindrical lens has a focal length to focus said line of light in a predetermined length extending substantially perpendicular to a scanning direction of said line of light.

3. The apparatus of claim 2, wherein said laser beam has a predetermined energy density and said cylindrical lens focal length focuses said line of light at a predetermined width to provide a spot power density along said predetermined length of said light line to cause smoothing and densification of the coating in a single scan.

4. The apparatus of claim 3, wherein said laser is a $CO_2$ laser having an energy density of about 3500 w/cm$^2$–11,000 w/cm$^2$ and said predetermined width is about 0.030".

5. The apparatus of claim 3, wherein the coating is a thermal barrier coating on a gas turbine engine component.

6. The apparatus of claim 5, wherein said line of light has a predetermined spot power density to cause an upper portion of said thermal barrier coating to melt and resolidify in a denser layer with a surface roughness of less than about 100 μin. $R_a$.

7. The apparatus of claim 1, wherein said line of light is oscillated at a frequency substantially faster than a scanning speed of said line of light.

8. The apparatus of claim 1, wherein said beam spinner is driven by a variable drive motor to permit adjustment of an oscillation speed relative to a scanning speed of said line of light.

9. The apparatus of claim 1, wherein said line of light has a predetermined spot power density and is oscillated at a speed relative to a scanning speed of said line of light to provide a surface roughness of less than about 50 μin. $R_a$.

10. A method for making a coated workpiece, comprising the steps of:

(a) depositing a coating of material on a workpiece;

(b) forming a line of laser light;

(c) scanning the line of laser light at a scanning speed across the coating to cause smoothing and increased density of at least an upper portion of the coating to form a glaze within a heat affected zone (d) selecting a laser spot power density; and (e) oscillating the line of laser light at a speed relative the scanning speed to homogenize the heat affected zone and to provide a surface roughness of less than about 100 μin. $R_a$.

11. The method of claim 10, wherein the line of laser light is oscillated at a speed substantially faster than a scanning speed of the line of light.

12. The method of claim 10, further comprising the step of controlling an oscillation speed of the line of light relative to a scanning speed of the line of light.

13. The method of claim 10, wherein the coating is a thermal barrier coating deposited on a gas turbine engine component.

14. A method to reduce the surface roughness of a thermal barrier coating on a gas turbine engine component, comprising the steps of:

(a) applying a line of laser light substantially perpendicular to the thermal barrier coating; and (b) scanning said lute of laser light across the gas turbine engine component such that said line of laser light glazes an upper portion of said ceramic coating, causing said upper portion to melt and then to densify upon resolidification, wherein said upper portion has a resulting surface roughness of less than about 100 μin.

15. The method of claim 14 further comprising the step of oscillating said line of light to homogenize any adverse effects caused by hot spots along the line of said laser light and to provide increased smoothing and uniform thickness of said upper portion.

* * * * *